July 28, 1970     W. R. MORCOM     3,521,825

MILLING PROCESS

Filed Feb. 13, 1967

WITNESSES:
Leon M. Garman
James F. Young

INVENTOR
William R. Morcom
BY
ATTORNEY

United States Patent Office 3,521,825
Patented July 28, 1970

3,521,825
MILLING PROCESS
William R. Morcom, Livingston, N.J., assignor to Westinghouse Electric Corporation, Pittsburgh, Pa., a corporation of Pennsylvania
Filed Feb. 13, 1967, Ser. No. 615,820
Int. Cl. B02c *17/22*
U.S. Cl. 241—26   1 Claim

ABSTRACT OF THE DISCLOSURE

A method of providing for the homogeneous dispersion of a second phase material in a matrix material through a milling process. The matrix material is placed in a milling jar which is lined with and/or includes milling balls constructed from the second phase material. By controlling the various milling parameters a preselected amount of second phase material is abraded into the matrix powder.

BACKGROUND OF THE INVENTION

In the preparation of metal alloys, the more homogeneous the dispersion of second and succeeding phase materials in the base or matrix material the better the alloy from the standpoint of strength and machinability. Obviously, one of the most important attributes an alloy can have with respect to providing improved strength and machinability is uniformity of structure. Such structural uniformity depends directly upon the fineness of the dispersed particles and the homogeneity of the dispersion.

In addition to providing improved machinability and strength to the alloy, the fine, homogeneous dispersion of second phase materials provided by the process of the present invention is believed to also, in the case of a thoria dispersion in powdered tungsten, impart improved emission characteristics to filament wires constructed from the alloy. The improved strength and machinability furthermore, facilitates the working of alloy ingots into the fine wire required for lamp filaments.

SUMMARY OF THE INVENTION

An object of the present invention is to provide a method for the homogeneous dispersion of very fine second phase particles in a matrix powder.

Another object of the present invention is to provide a milling process whereby a second phase material will be homogeneously dispersed throughout a base or matrix powder.

A further object of the present invention is to provide a process for the homogeneous dispersion of very fine particles in a base or matrix powder wherein the percentage of dispersoid material which is homogeneously distributed throughout the base or matrix powder may be controlled by varying the parameters of the milling process.

The foregoing objects are accomplished in accordance with the present invention by employing a rotatable milling jar having a plurality of milling balls, matrix or base powder, and a milling media disposed therein and wherein either the lining material of the milling jar or the milling balls, or both, consist of a uniformly wearable form of the second phase material, whereby upon rotation of the milling jar about an axis of symmetry at preselected speeds for preselected time periods a homogeneous dispersion of a preselected quantity of said second phase material in the matrix material will be provided.

BRIEF DESCRIPTION OF THE DRAWING

The foregoing objects, and others, as well as many of the attendant advantages of the present invention will become more readily apparent and better understood as the following detailed description is considered in connection with the accompanying drawings, in which.

DESCRIPTION OF THE PREFERRED EMBODIMENT

Although the process of the present invention is particularly adapted for the dispersion of second phase material in powdered tungsten, it should be understood that for any purpose wherein it is desired to provide a very fine homogeneous dispersion of a second phase material in a base or matrix material or powder, that the process of the present invention is equally suitable. With respect to tungsten wire, the addition of either alumina ($Al_2O_3$) or thoria ($ThO_2$) may be accomplished by the present invention in the form of a very homogeneous mixture of finely divided alumina or thoria particles in the tungsten powder. Other applications as for example, the dispersion of titania in copper, magnesia in silver, or zirconia in tungsten or other metals may be accomplished equally well through the process of the present invention.

Figure 1:
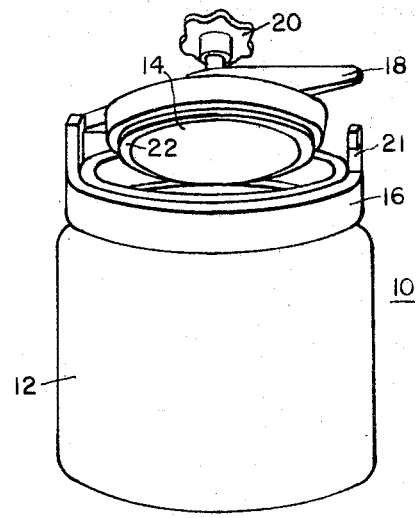
FIG. 1 is a perspective view of one form which the container or milling jar, employed in practicing the present invention, may take.
Figure 2:
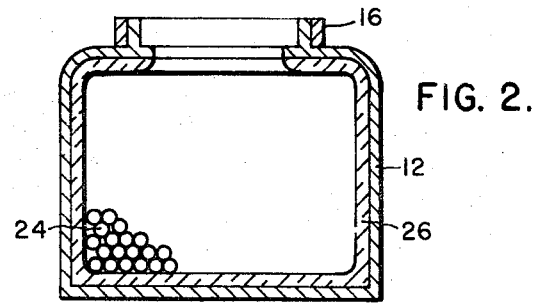
FIG. 2 is a sectional view of a container or milling jar of the type employed in practicing the present invention.

FIG. 1 illustrates a conventional milling or grinding jar generally designated 10. The jar base 12 may be constructed of for example, special wear-resistant porcelain or stainless steel and is equipped with a lid or closure 14 which facilitates the sealing of the milling jar. The lid or closure member 14 is secured to the base 12 by means of a conventional metal collar 16 and lock bar 18. The hand wheel 20 secures the lock bar 18 tightly in place under latch arms 21 on the metal collar 16. A sealing ring or gasket 22 coacts between the base of lid 14 and the upper edge of jar 12 to provide an air-tight seal for the milling jar.

In accordance with the present invention, either the plurality of milling balls 23, or an interior lining 26 within the jar body 12, or both, may be constructed from a uniformly wearable form of the desired second phase material which will abrade into the matrix powder. Although the milling balls have been illustrated and described as spherical, they may be cylindrical or of other geometry of a suitable size to impart adequate crushing or shearing forces to the material being milled. As will be apparent, more than a single dispersoid material can be homogeneously dispersed throughout the matrix material by providing the milling jar with a liner constructed from one dispersoid material and the milling balls from one or more other desired dispersoid materials.

Figure 3:
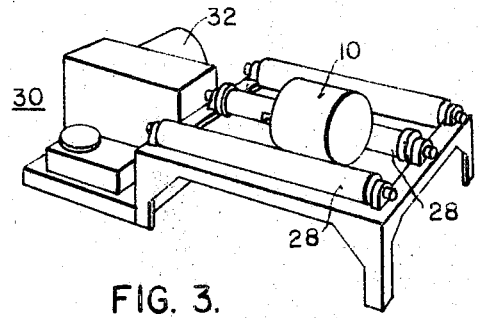
FIG. 3 is a perspective view of one form which the mechanism for imparting rotation to the milling jar may take when practicing the present invention.

In practicing the present invention, the milling jar is filled to between 20 and 80% of its volume with the matrix powder and milling balls and covered to about ½ inch depth with a milling media, for example distilled water. The milling jar is then sealed and agitated by a continuous motion, generally rotational about an axis of symmetry. FIG. 3 illustrates a mechanism for providing the milling action. A milling jar 10 is positioned on its side between a pair of driven rubber covered rollers 28. The rollers 28 are driven by a motor 32 in the mill driving mechanism 30 by means of a pulley (not shown). The milling mechanism 30 may be equipped with a tachometer, timer and variable speed drive if desired. As will be apparent, the rubber coated rollers 28 impart a rotary action to the milling jar 10 causing it to rotate about its axis of symmetry.

In doping very fine tungsten powder of approximately 3/10 of a micron size, a grinding jar having a 1500 milliliter volume was filled to 55% of its depth or bulk with 1/2 inch diameter alumina ($Al_2O_3$) balls and the interstices between the balls filled with one kilogram of tungsten powder. This 55% fill was then covered to a depth of about 1/2 inch with distilled water and the milling jar sealed. After a milling time of 72 hours, at 90 r.p.m., the evaporated powder remaining consisted of the initial tungsten charge in powder form with an extremely homogeneous 7 1/2% dispersion of very fine alumina particles.

Of course, a number of milling parameters are significant with respect to the concentration of the dispersoid introduced during milling, and these parameters for specific dispersions must be determined empirically. For example, the size and weight of the milling balls, the physical nature of the dispersoid material contained in either the lining or the balls, the mill speed, quantity of milling balls, the media and material to be milled within the milling jar are all factors which affect the final dopant concentration. Although in the past the second phase material and the matrix material have been added in powder form and similarly milled, the dispersion of second phase material within the matrix material does not approach the extremely homogeneous dispersion possible by employing the process of the present invention.

Since numerous changes may be made in the above-described process without departing from the spirit thereof, it is intended that all matter contained in the foregoing description or shown in the accompanying drawings, shall be interpreted as illustrative and not in a limiting sense.

I claim as my invention:

1. The method of providing a homogeneous dispersion of a very fine second phase material of at least one material selected from the group consisting of alumina and thoria into a tungsten matrix powder comprising the steps of:
   (a) filling a rotatable milling jar, having a lining, with a plurality of milling balls, a predetermined amount of said tungsten matrix powder and a milling media of distilled water, both said lining and said milling balls consisting essentially of said second phase material of said group;
   (b) sealing said milling jar; and
   (c) rotating said milling jar about an axis of symmetry at a preselected speed for a preselected time sufficient to cause a predetermined amount of said second phase material from said group to be abraded into said tungsten matrix powder as a homogeneous dispersion.

References Cited
UNITED STATES PATENTS

| | | | |
|---|---|---|---|
| 1,913,100 | 6/1933 | Balke | 241—16 X |
| 2,011,369 | 8/1935 | McKenna | 241—16 X |
| 3,110,448 | 11/1963 | Landes | 241—183 X |
| 3,172,546 | 3/1965 | Schreiner | 241—176 X |

ROBERT C. RIORDON, Primary Examiner

M. G. RASKIN, Assistant Examiner

U.S. Cl. X.R.

241—182, 184